Aug. 28, 1962

L. C. DOZIER, JR 3,050,995

AUTONAVIGATOR

Filed July 9, 1954

INVENTOR.
LEONARD C. DOZIER, JR.
BY *William L. Levine*
ATTORNEY

Aug. 28, 1962

L. C. DOZIER, JR 3,050,995

AUTONAVIGATOR

Filed July 9, 1954

*INVENTOR.*
LEONARD C. DOZIER, JR.
BY
ATTORNEY

INVENTOR.
LEONARD C. DOZIER, JR.
BY William R Lane
ATTORNEY

Aug. 28, 1962   L. C. DOZIER, JR   3,050,995
AUTONAVIGATOR

Filed July 9, 1954   11 Sheets-Sheet 5

INVENTOR.
LEONARD C. DOZIER
BY
ATTORNEY

Aug. 28, 1962

L. C. DOZIER, JR 3,050,995

AUTONAVIGATOR

Filed July 9, 1954

INVENTOR.
LEONARD C. DOZIER, JR.

BY William P. Lane

Aug. 28, 1962 L. C. DOZIER, JR 3,050,995
AUTONAVIGATOR
Filed July 9, 1954 11 Sheets-Sheet 10

INVENTOR.
LEONARD C. DOZIER, JR.
BY
William R. Lane
ATTORNEY

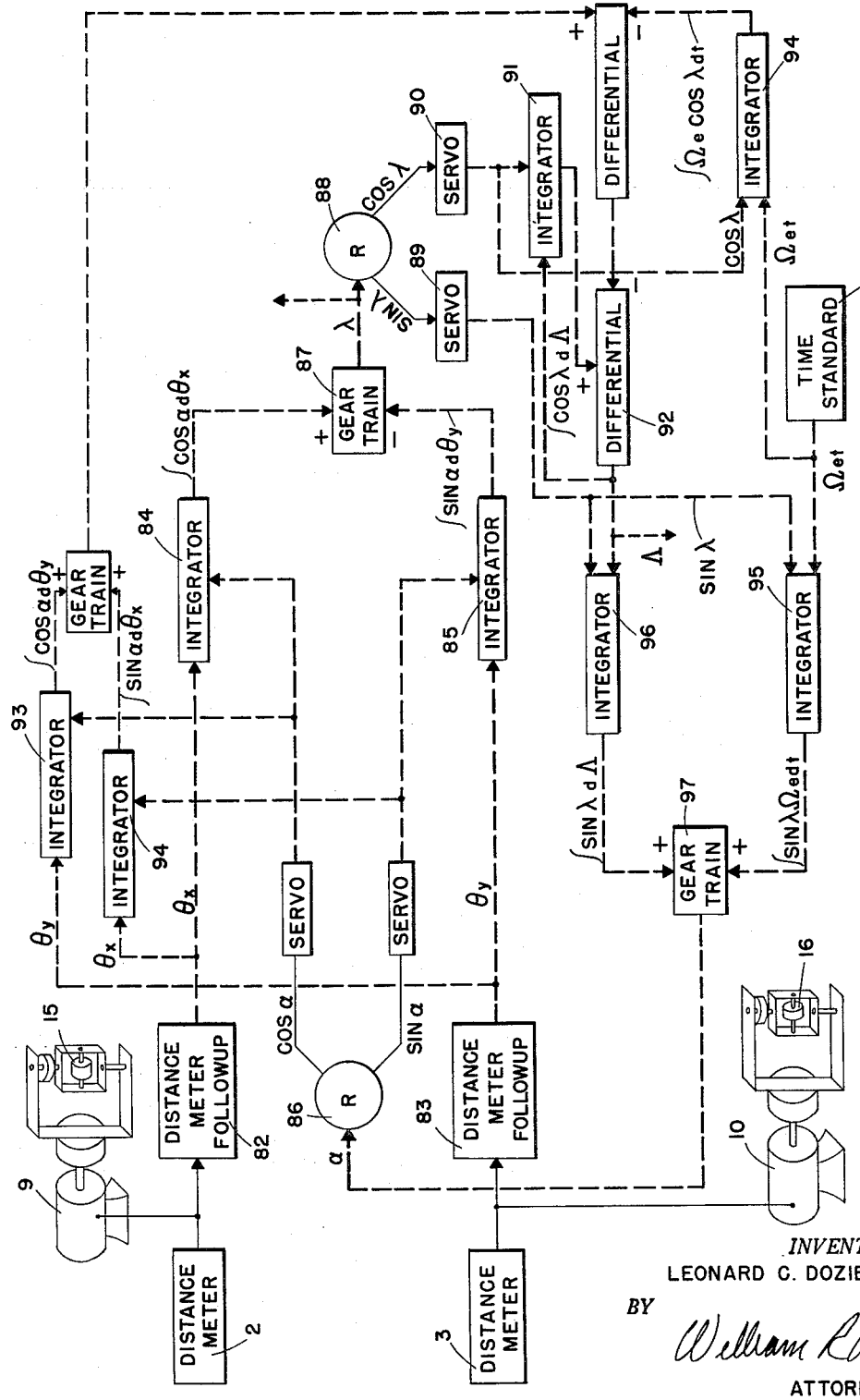

United States Patent Office 3,050,995
Patented Aug. 28, 1962

3,050,995
AUTONAVIGATOR
Leonard C. Dozier, Jr., Whittier, Calif., assignor to
North American Aviation, Inc.
Filed July 9, 1954, Ser. No. 442,255
15 Claims. (Cl. 73—178)

This invention relates to autonavigators and to that portion of an autonavigator commonly referred to as the "stable platform." Particularly, it refers to that type of stable platform incorporating three gyros whose input axes are disposed at right angles to each other.

Because of the ability to maintain their original plane of rotation in space, gyros are used in autonavigation to stabilize platforms for the mounting and orientation of distance meters. In this way, the distance meters are pointed in a particular direction and dead reckoning navigation can be accomplished.

The methods of stabilization by gyro are many and varied. For instance, the gyro assembly can be rigidly fixed to the platform on which the distance meters are mounted. Then, to maintain the distance meters locally level requires that the gyros be continuously torqued to cause precession at rates commensurate with total earth's rotation to compensate for both the earth's angular rotation and angular movement of the platform about the center of the earth. The correction for angular movement of the platform is dictated by velocity data, in the form of a voltage or current, obtained from the distance meters and imposes the requirement that this information be of the highest accuracy. A similarly accurate voltage or current is required to correct for earth rotation. These voltages or currents are combined and used to actuate gyrotorquers of highest quality. The demands of such a system are stringent.

Alternately, the plane of rotation of the gyros may be maintained fixed in inertial space and the gyros are connected to the distance meter platform by a structure in the form of an equatorial mount. Here it is required that control signals to maintain the platform locally level be transmitted through three gimbals in series. This demands precision of formulation of the equatorial mount structure and additionally renders the initial alignment of the platform very difficult.

Another platform scheme concerns precessing the gyros at a constant rate equivalent to earth rotation at the launching point. As a minimum, this requires very accurate and stable voltage or current reference source to activate precision gyro torquers or a spring torquer of a similar high degree of precision.

To circumvent most of these objectional characteristics, a new platform system is herein described. The concept is the mounting of three gyros with their input axes disposed orthogonally (perpendicularly), providing orientation of the platform upon which they are mounted. Also, situated upon the oriented platform are distance meters which provide, to the gyros, compensation necessary as a result of platform motion in inertial space. In this invention, instead of precessing the gyros by continuously torquing them by electromagnetic torquers using an accurate voltage source, compensation for earth's rotation and distance traveled is accomplished by gear drives turning the gyros about their respective input axes.

It is therefore an object of this invention to provide a stable platform effected by three gyros whose input axes are orthogonally disposed.

It is a further object of this invention to provide a stable platform which is torqued according to the output of one or more gyros.

It is a further object of this invention to provide a stable platform incorporating precision drives associated with each gyro whereby the separate gyros can be independently rotated about their sensitive axes with respect to the platform.

It is a further object of invention to provide a stable platform of the form indicated that utilizes distance meter output for operating the precision drives to thereby orient the platform and distance meters so that they are locally level at all times.

It is a further object of invention to provide a stable platform of the form indicated that incorporates distance meters, the output of which provides information as to distance traveled in space for operating the precision drives to orient the platform and distance meters locally level at all times when the platform is in motion about the center of the earth.

Other objects of invention will become apparent from the following description taken in connection with the accompanying drawings, in which FIG. 1 is a rudimentary perspective illustrating the functional concept of the invention;

FIG. 15 illustrates computer mechanism.

Figure 1:
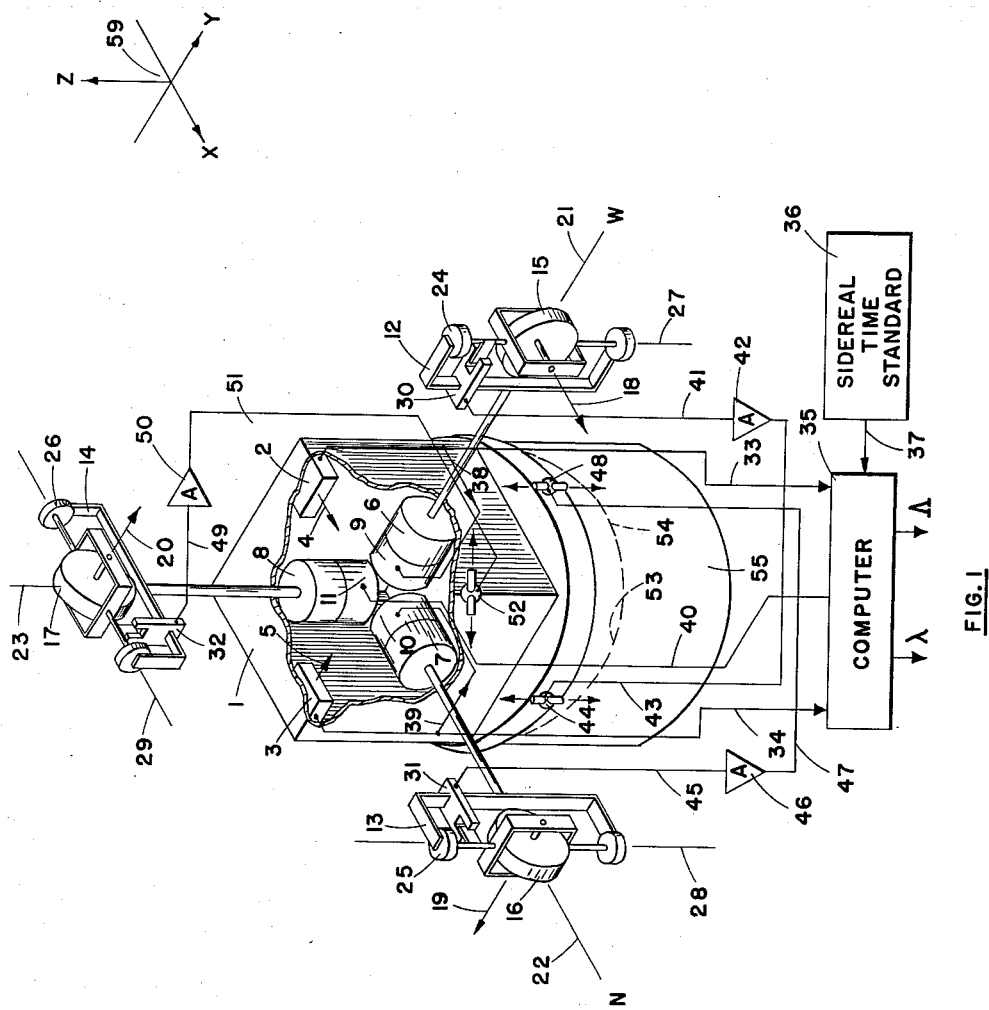

In FIG. 1, is shown a stable platform 1 in which are mounted distance meters 2 and 3 having sensitive axes, respectively, as indicated by arrows 4 and 5. Also mounted on platform 1 are precision gear drive units 6, 7, and 8 having motor drives, respectively, as indicated at 9, 10, and 11. The output shafts of precision drive units 6, 7, and 8 are connected respectively to gyro cases 12, 13, and 14 drawn as gimbal frames.

Gyros 15, 16, and 17 whose axes of rotation are indicated at 18, 19, and 20, have corresponding input axes at 21, 22, and 23. The gyros are respectively supported by gimbal bearings 24, 25, and 26 along their output axes 27, 28, and 29. Pick-offs 30, 31, and 32 are respectively mounted on gimbal frames 12, 13, and 14 to sense the output of gyros 15, 16, and 17. Pick-off 30 is connected by wiring 41 to amplifier 42 and thence by wiring 43 to air-jet torquer 44 mounted on platform 1. Similarly, pick-off 31 is connected by wiring 47 to torquer 48 mounted on platform 1. Finally, pick-off 32 is connected by wiring 49 to torquer amplifier 50 and thence by wiring 51 to torquer 52 mounted on platform 1.

Various forms of pick-off are used to detect precession of the gyros. FIG. 1 indicates the well-known E pickoff. Further explanation of this pick-off is contained in Theory of Servomechanisms, Massachusetts Institute of Technology Radiation Laboratory Series, vol. 25, pages 102 and 103. An electromagnet pick-off is also illustrated in Patent No. 2,625,045 for "Gyro Bearing" in the names of J. W. Brubaker et al. A capacitive pick-off is also suitable to detect relative motion between elements such as occurs in gyro precession. The torquers may be of conventional form, such as air-jet or electromagnetic construction or torque motor and gear drive. Two typical electromagnetic torquers are illustrated in FIGS. 13 and 14.

Figure 13:
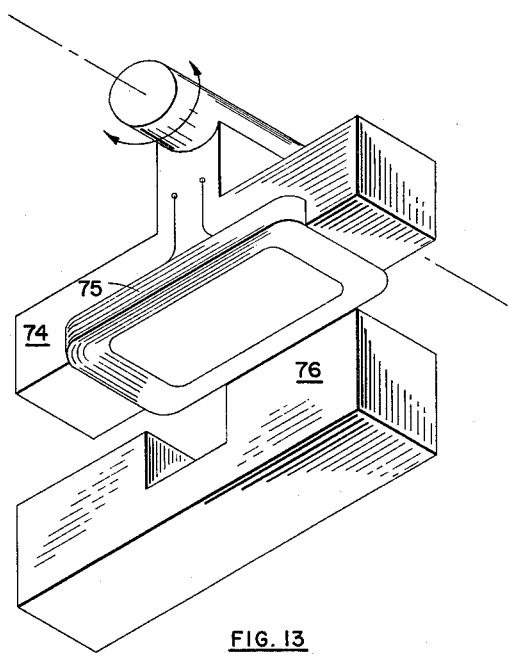
FIGS. 13 and 14 are perspectives of electromagnetic torquers.
Figure 14:
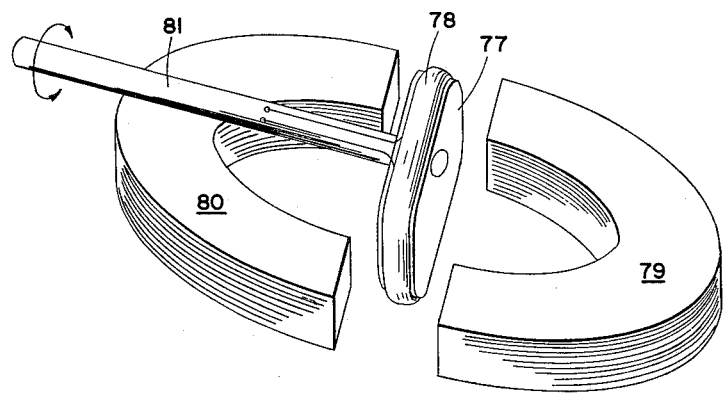

In FIG. 13 a soft iron core 74 has a coil 75. Permanent magnet 76 in close spaced relationship will produce a transverse force upon core 74 is accordance with the torquing signal fed to coil 75. A smaller type of torquer, FIG. 14, has a pancake core 77 upon which is wound coil 78 which lies between two permanent magnets 79 and 80 whose poles oppose each other. A signal fed to coil 78 causes incipient rotation, or torque, upon shaft 81.

Connections 33 and 34, FIG. 1, respectively, provide inputs from distance meters 2 and 3 to computer 35. Connections 38, 39, and 40 are connected to motor drives 9, 10, and 11 which power precision gear drives 6, 7, and 8. Additional input information is injected into computer 35 by sidereal time standard 36 by wire 37. The computer upon receiving motion information from the distance meters and earth rotation information from the time standard, feeds predetermined functions of these factors into the motor drive 11. The motor drive units 6 and 7 receive drive signals directly from distance meters 2 and 3. Each gyro is, therefore, rotated about its input axis an amount necessary to correct it for distance traveled over the earth's surface and for the passage of time (or its related earth rotation). The platform, as a result of these drives, remains locally level.

Figure 2:
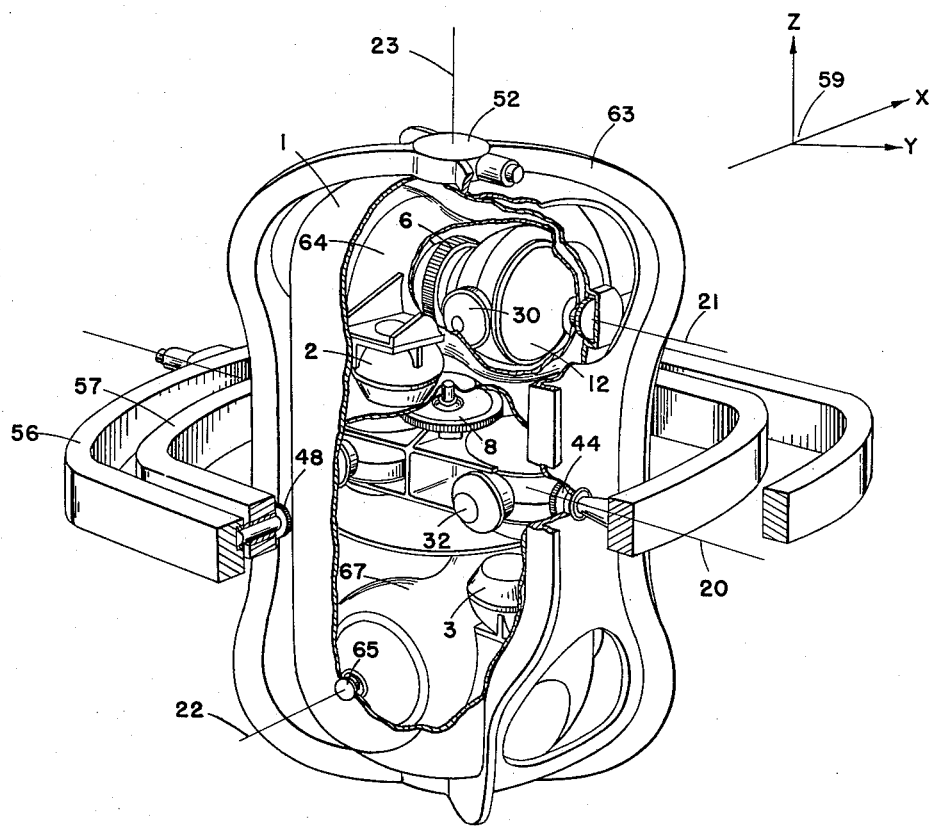
FIG. 2 is an embodiment of the concept of FIG. 1 in external gimbal mount and utilizing paired gyros and an extra case between the gyro pairs and the stable platform.
Figure 3:
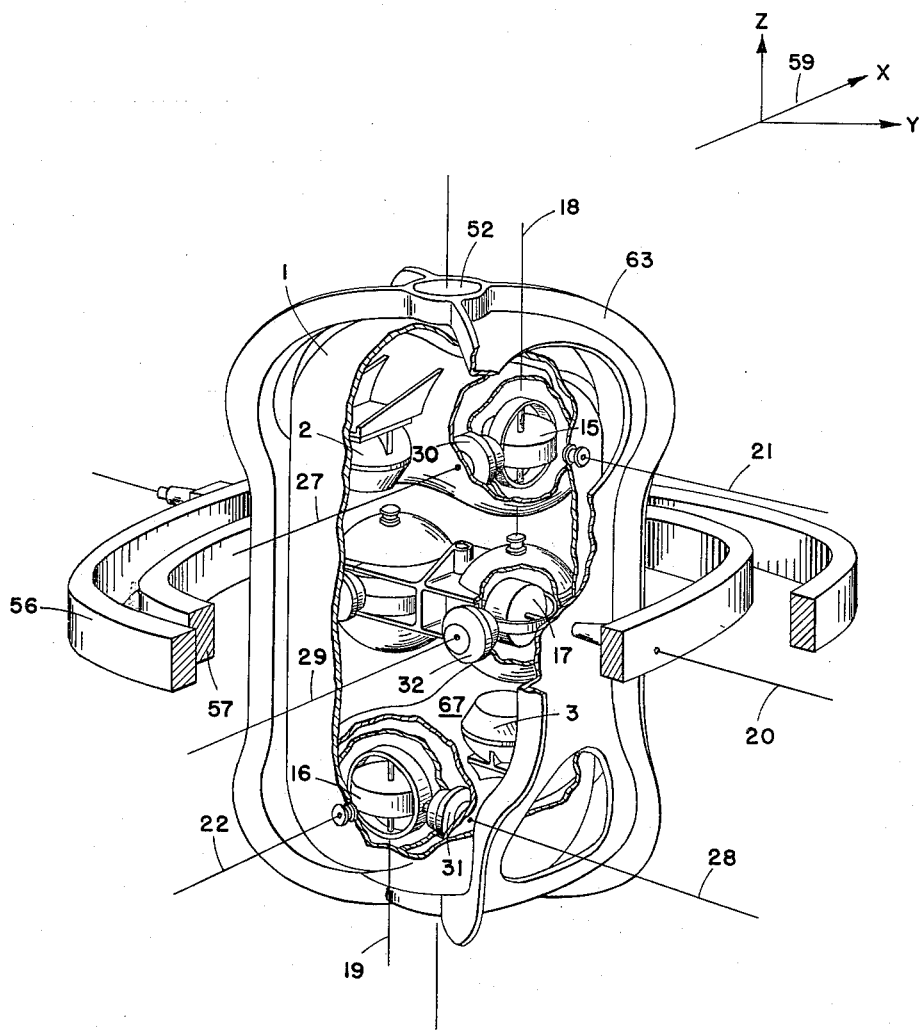
FIG. 3 is the embodiment of FIG. 2 further cut away.

In visualization of the platform assemblage of FIG. 1, the platform 1 is formed into spherical shape 53 at the bottom. Spherical bottom 53 rests in spherical shell 54, which is the top part of support structure 55, and is supported therein by forming a low friction bearing. Gimbals are conventional means to support the platform 1 with respect to structure 55. A form of gimbal mounting is shown in FIGS. 2 and 3. Two gimbals 56 and 57 are supplemented by case structure 63 forming the third gimbal. The distance meters 2 and 3 are shown, and in FIG. 3 gyro cases are broken away to show rotor mounting. The gyros depicted in FIGS. 2 and 3 are those of the self-compensating pair type, which are described in patent application No. 200,234, December 11, 1950 for "Self-Compensation Gyro Apparatus" in the names of Darwin L. Freebairn et al., which became Patent No. 2,999,391.

A coordinate system 59 is indicated in FIGS. 1, 2, and 3, in which the axes $x$, $y$, and $z$ are orthogonally oriented with respect to the earth. $z$ is the vertical, $x$ is the forward, and $y$ is lateral direction.

The distance meters 2 and 3, FIG. 1, have their sensitive axes 4 and 5 oriented in a particular fashion. Axis 4 of distance meter 2 is here shown parallel to the $x$ axis of the coordinate system 59 and, hence, to the input axis 22 of gyro 16. Axis 5 of distance meter 3 is parallel to the $y$ axis of the coordinate system and, hence, to input axis 21 of gyro 15. The $x$ axis may or may not be the direction of flight.

It is obvious that any inertial sensitive device of sufficient accuracy may replace distance meters 1 and 2. These devices are variously named accelerometers and velocity meters. In order to obtain distance traveled from an accelerometer, double integration of the force of inertia is necessary. A suitable distance meter is disclosed in patent application Serial No. 57,686, filed November 1, 1948, for "Accelerometer and Integrator" in the name of John M. Wuerth, which became Patent No. 2,882,034. Other distance measuring devices are illustrated in Patent No. 2,266,449, for "Navigation Apparatus" in the names of E. H. Ullrich et al., and Patent No. 2,371,626 for "Speed Indicating Apparatus" in the name of L. Kecskemeti.

The torquers are orthogonally oriented as shown in FIG. 1. Torquer 44 is mounted on foundation structure of platform 1 so as to produce torquing reactions on the platform, about the center of spherical shape 53 resulting in torque about an axis parallel to input axis 21 of gyro 15. Torquer 48 is mounted on foundation structure of platform 1 so as to produce torquing reaction on the platform about the center of spherical shape 53 resulting in torque about an axis parallel to sensitive axis 22 of gyro 16. Torquer 52 is mounted on foundation structure 1 so as to produce torquing reactions on the platform, about the center of spherical shape 53, resulting in torque about an axis parallel to sensitive axis 23 of gyro 17. The arrows pointing in opposite directions indicate that these torquers can be operated to produce torque on the platform in either direction.

Torquers 44, 48, and 52, FIG. 2, indicate motor drive means of torquing the platform similar to the air-jet torquers 44, 48, and 52 of FIG. 1. These torquing drives are operated by electrical signals from the gyro pick-offs 30, 31, and 32 shown in FIGS. 1 and 3.

It is noted in the gimbal suspended embodiment of FIGS. 2 and 3, a modification occurs in the mounting of the distance meters. Distance meter 2, measuring along the $x$ axis (or path of flight), is affixed to the case surrounding gyro 15 which is sensitive to any torques causing pitch in the distance meter. That is, the sensitive axis of gyro 15 insures that distance meter 2 is kept horizontal, so far as pitch is concerned, by being attached to the case surrounding gyro 15. Both distance meters are kept aligned in the direction originally chosen for them (with respect to yaw) by gyro 17 which operates to torque platform element 1 to maintain this alignment. Electrical torquer 52 provides the torque required, as indicated by gyro 17. Torquer 48, FIG. 2, indicates mechanical means of torquing gimbal 57 with respect to outer gimbal 56 to maintain the alignment. In FIG. 2 is shown an alternate structural arrangement of the gyro drives 6 (7 not shown), and 8. Motors 9, 10, and 11 which would actuate these drives are not shown.

Upon misorientation of the platform, it must necessarily be returned to a corrected position by separate rotations about the three sensitive axes of the gyros. These misorientations, of course, result in an output by the affected gyros; and the pick-offs 30, 31, and 32 produce signal indications to correct the platform. As indicated schematically, in FIG. 1, these signals react through amplifiers to actuate the proper torquer to correct the platform alignment. This is all effected by the gyros being inertially restricted with respect to their individual input axes. That is, each gyro is restrained in its movement about its input axes. Each gyro can only rotate with respect to the platform, when its respective drive rotates it.

The only rotation experienced by each gyro in space is perpendicular to its particular input axis. The upward axis 23 of gyro 17 is coincident with a radius to the center of the earth. The forward axis 22 is locally horizontal and may be considered to lie in the direction of flight. The sidewise, or lateral, axis 21 is locally horizontal and may be considered to be normal to the direction of flight. Under conditions in which direction of flight changes, this would not remain true.

For simplicity in describing the functioning of the interrelated platform elements, assume a typical case in which the input axis 21 points eastward, input axis 22 points southward, and sensitive axis 23 points upward. It is assumed that sensitive axes 21 and 22 are initially oriented locally level or horizontal. At the earth's equator, in a situation as described, because the input axis 22 of gyro 16 is a northward axis, drive 10 must rotate gyro 16 about its input axis 22 relative to the platform at the opposite of the earth's rotational rate. This provides a compensation to the platform for earthly rotation. To accomplish this, in this instance, the distance meter detects motion in space including that caused by earth rotation and causes the gyros to be rotated accordingly. Each distance meter, then, provides an output equal to its absolute velocity in its sensitive direction, including that caused by the earth's rotation. The output from distance meter 3 powers motor drive 10 and rotates gyro 16 about axis 22 at reversed earth rate relative to the platform. This requires that with respect to space the platform itself rotate at the earth rate, and such rotation is effected by drive 48, responsive to incipient rotation of the motor shaft and frame 13 in space, to rotate instead the motor body and the platform at the earth rate. The end result of this operation is that gyro 16 does not rotate in space about its input axis, gyros 15 and 17 and the stable platform are rotated in space about axis 22 (no rotation about their respective input axes), and the platform is continuously maintained locally level. During this function, an observer on the earth looking at the platform would observe gyro 16 rotating slowly about input axis 22 (one revolution per sidereal day), the remaining elements would appear motionless.

Now it may seem that rotation in space of gyros 15 and 17 about axis 22 once a day would produce some reaction in them. This is true and is dependent on the orientation of their associated spin axes with respect to axis 22. For instance, in the construction shown in FIG. 1, spin axis 18 of gyro 15 is defined parallel to axis 22 while spin axis 20 of gyro 17 is normal thereto. Therefore, rotations about axis 22 will be without effect on gyro 15 but will operate to cause pick-off 32 to indicate a disturbing torque on gyro 17. Torquer 52 would, of course, immediately neutralize this disturbing torque. At the North Pole, gyro 17 would rotate at reverse earth rate relative to the platform once a day (caused by motor 8) and the other two gyros would appear motionless with respect to the platform.

Operation of the platform in a navigational problem is merely an extension of these simple cases. Computer 35 receives input information from time standard 36 and distance meters 2 and 3 and its outputs signals will, in turn, drive motor drive 11 the necessary amount to produce precession torquing signals that, in turn, torque the platform appropriately. Thereby, the platform is oriented in a desired direction at all times during flight.

Figure 4:
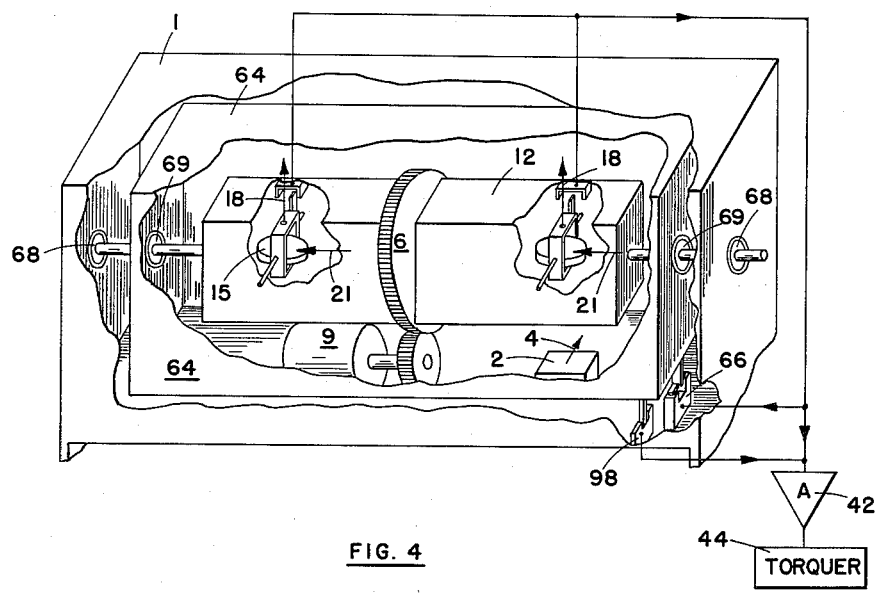
FIG. 4 is a perspective of a gyro case and its precision gear drive with respect to the platform.
Figure 5:
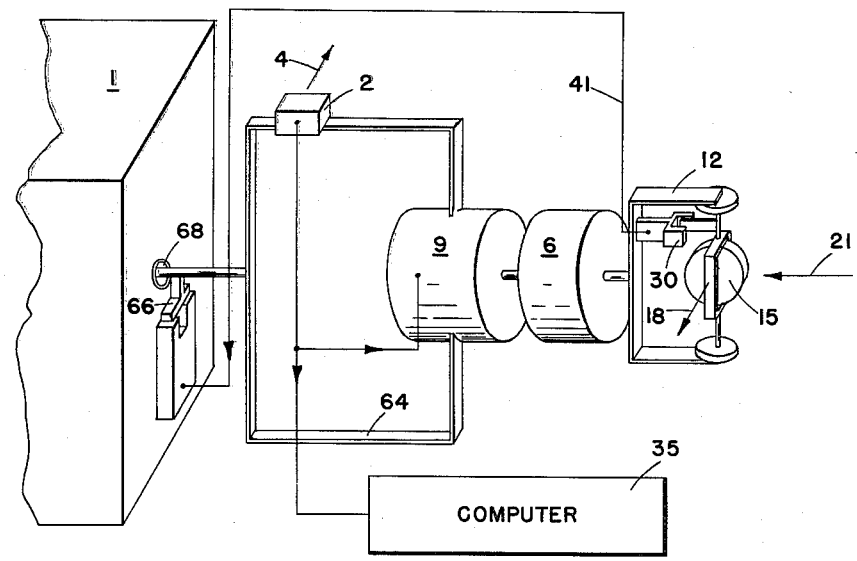
FIG. 5 is a partial schematic indicating the functional relationships illustrated in FIG. 4.

An improved method of mounting the gyro case with respect to the stable platform 1 is indicated in FIG. 2. Considering the topmost gyro having enclosing case 12, there is now situated between said case 12 and stable platform 1 an intermediate frame 64. In this particular modification, motor 9, FIG. 4, and gear drive 6 are mounted to drive gyro case 12 with respect to intermediate frame 64. FIG. 5 illustrates the same arrangement in the style of FIG. 1. It is noted that intermediate frame 64, FIG. 4, is bearing mounted at 69 with respect to gyro case 12, and also that intermediate frame 64 is bearing mounted at 68 with respect to the stable platform. Rotating torques other than those from motor 9 attempting to displace intermediate frame 64 relative to platform 1 are removed or counterbalanced by torquer 66 (added for this improvement) which receives information from gyro pick-off 30 which is situated to detect any incipient rotation with respect to inertial space, of gyro 15 and, consequently, to detect any incipient failure by frame 64 to maintain the relative rotational or non-rotational condition necessary to hold gyro 15 fixed in space. In this embodiment, torquer 66 provides fine torque adjustment and platform torquer 44 need not be so precise as in other instances. Torquer 44 is similar to a follow up. Pick-off 98 detects the deflections of frame 64 relative to platform 1 and provides a signal to torquer 44 in conjunction with the pick-off signals detected at gyro 15. Noticing that the input axis of the gyro is in the direction indicated by arrows 21, it can be seen that the disturbing effect the rest of the stable platform has on this particular gyro is considerably reduced and somewhat limited to that transmitted by friction through ball bearing mounts 68 and 69. Having removed many transient disturbing torques, critical servo performance is no longer required of torquers 44, 48, and 52 and they may now have slower response to acquire the same degree of platform stabilization. The overall effect may be described as reducing the degree to which the platform itself must be kept accurately stabilized by partially isolating each gyro case and inertial distance meter within an intermediate case 64.

In those cases in which motor 9 and inertial distance meters 2 and 3 are rigidly fixed with respect to the stable platform as illustrated in FIG. 1, any disturbing torques experienced by the platform are distributed to the gyros and accelerometers. One such example of a disturbing torque would be that wherein the stable platform is not delicately balanced ("balanced" defined as having the center of gravity at or near platform center of rotation) and undergoing acceleration or deceleration. Such partial structural isolation of gyros and accelerometers as illustrated in FIGS. 2, 3, and 4 reduces the requirements as to platform balancing and reduces many of the disturbing torques experienced by the platform from being transmitted to the gyros and accelerometers.

Figure 6:
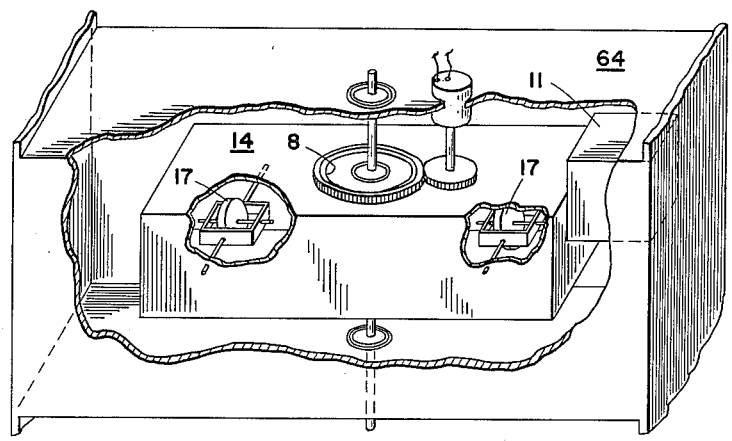
FIG. 6 is a perspective of another gyro case, partially broken away, and its precision gear drive.

FIG. 6 illustrates an alternate gear arrangement suitable for the middle gyro pair.

Figure 7:
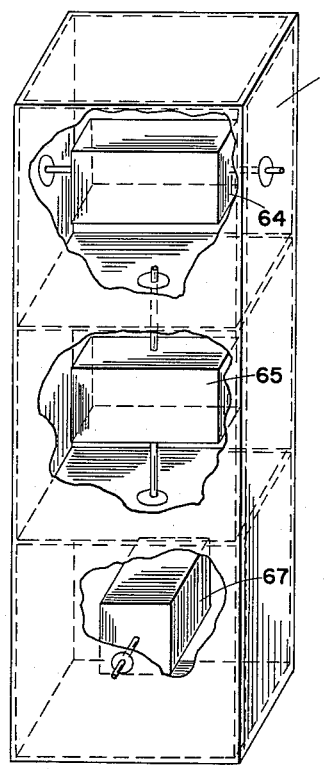
FIG. 7 is a perspective of an example of orientation of the rotational axes of the three gyro cases in the stable platform.

FIG. 7 indicates the relative rotational axes of the three separate intermediate frames 64, 65, and 67 with respect to stable platform 1.

Stable platforms, generally, are fixed relative to the earth and, therefore, are rotated in inertial space along with the earth's rotation. A physical effect of such rotation is the generation of an error in acceleration, as read by the distance meters, known as the acceleration of Coriolis. A further modification of the device, to remove the largest component of Coriolis effect from the distance meters, is one in which gyro 17 has no drive motor, or gears, and is not rotated with respect to the stable platform; but the stable platform as a whole is rotated around its vertical axis equally and oppositely to the earthly rotation rate. Thus, one component of earthly rotation is removed from the stable platform. The component removed is identified as the one caused by rotation about the vertical by the stable platform at its own locale. Viewing the stable platform at the North Pole, from the earth, the platform and gyro 17 in this modification would appear to rotate together at the earth's rotational rate. The rotation rate depends on latitude and varies from 360° a day, at the North Pole, to zero rotation at the equator.

Figure 8:
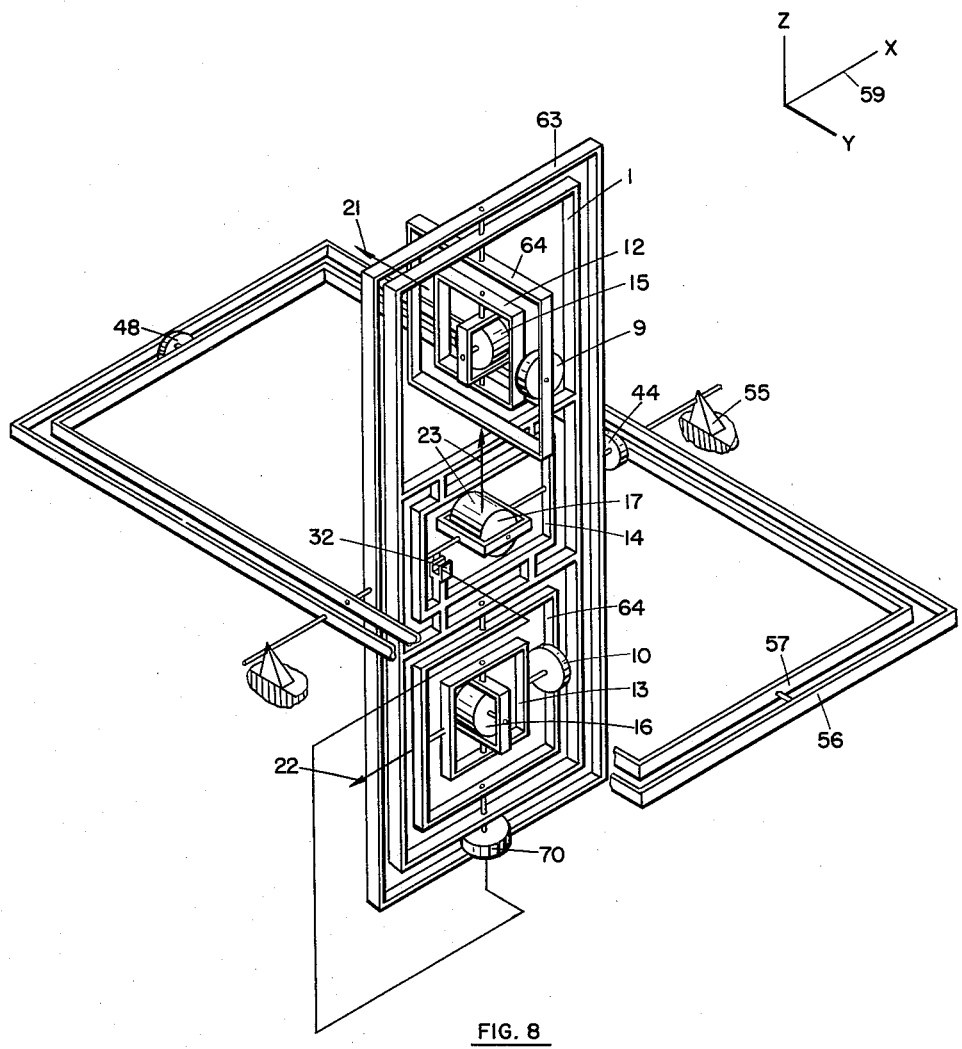
FIG. 8 is a bar diagram showing the various gimbal mounts and a modification in that the azimuth gyro is rigidly fixed to the platform and has no motor and precision gear drive.

In FIG. 8, a line diagram, case 14 of gyro 17 is restrained with respect to the stable platform, and any attempted rotation by the platform about the vertical (from its original orientation in space) is detected at the gyro by pick-off 32. Drive 70 receiving information as to disturbing torques on gyro 17 removes the torque by rotating the whole platform element 1. In effect, the platform is slaved to prevent input to the gyro whose sensitive axis is the local vertical or, what is the same, prevents any angular rotation in space by the platform about the local vertical.

The error caused by the acceleration of Coriolis on vertically insensitive accelerometers may be resolved into two components. One component of error is due to a combination of angular velocity about a local vertical axis (similar to the spinning of a top) multiplied by local horizontal velocity. The other component is described as a combination of angular velocity about a local level axis similar to the spinning of a wheel multiplied by vertical velocity. The first component above is generally much larger than the latter, since, generally, the velocity is approximately parallel to the earth's surface, and thus, vertical velocity is substantially zero.

Figure 9:
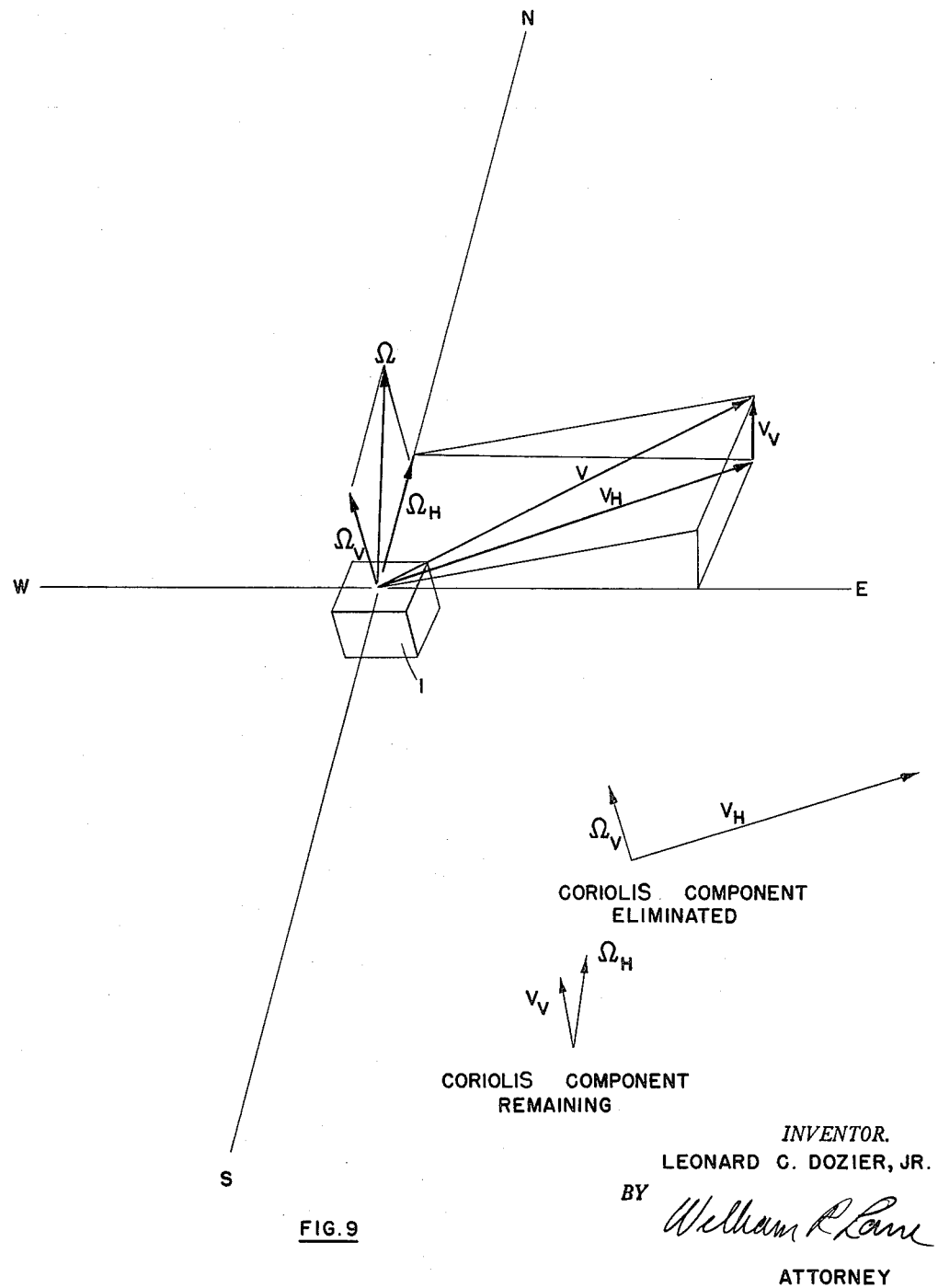
FIG. 9 is a vector diagram illustrating the velocity and angular velocity components of Coriolis.

FIG. 9 indicates how the modification of FIG. 8 removes one component of angular velocity. The letter $\Omega$ is the vector representing the total angular velocity. This vector includes the earth's rotation, plus that of the platform about the earth. At a given location the components of $\Omega$ are $\Omega_V$ (angular velocity about the vertical) and $\Omega_H$ (angular velocity about a local level axis). The acceleration of Coriolis appears as a vector cross product of $\Omega_V$ and $V_H$ (wherein $V_H$ is defined as horizontal velocity) plus the vector cross product of $\Omega_H$ and $V_v$ (wherein $V_v$ is defined as vertical velocity). If as previously described, the stable platform is slaved to its gyro 17 and prevented from rotating (in space) about its vertical axis, component $\Omega_V$ is removed from the stable platform as, consequently, is the corresponding Coriolis effect on the distance meters. The effects of the remaining smaller components $\Omega_H$ and $V_v$ may be forecast and accounted for, or controlled by limiting the vertical velocity to particular phases of the flight or, in some cases, neglected.

Figure 11:
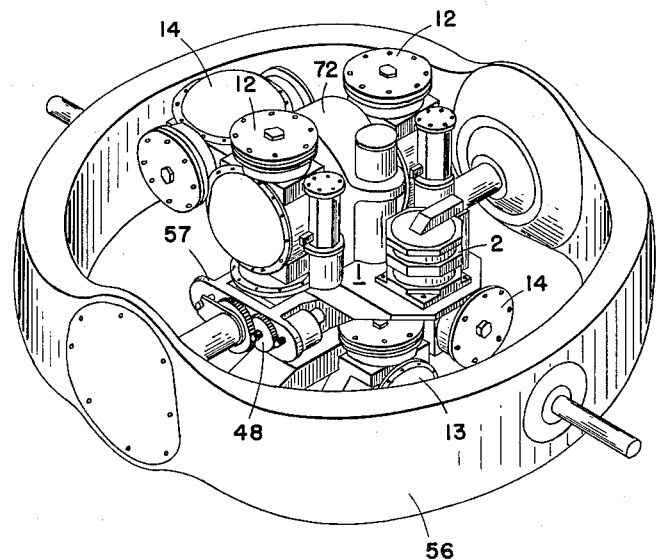
FIG. 11 is another embodiment of the concept of FIG. 1 utilizing inner gimbal structure.
Figure 12:
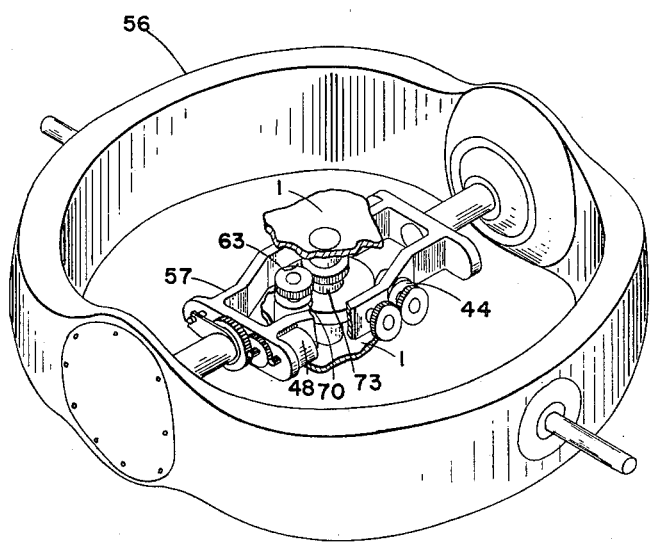
FIG. 12 is the embodiment of FIG. 11 broken away to show inner gimbal structure.

FIGS. 11 and 12 indicate another form of construction of the stable platform. The outer ring is gimbal 56, see FIG. 2. The remaining gimbals are inner gimbal 57, see FIG. 2, and inner gimbal 63 which is redundant with gimbal 56. Inner gimbal 63 is also a bearing housing. The platform is allowed rotation about the vertical by the fourth inner gimbal which may resolve to a mere shaft 73, FIG. 12, vertically suspended by the bearings mounted in gimbal 63.

Precision drive 6 between platform 1 and gyro pair 15, contained within housings 12, is contained within housing 72. The gyro mounting on the bottom half of the platform is the same as on the top except that the bottom half is turned upside down and rotated 90°.

Figure 10:
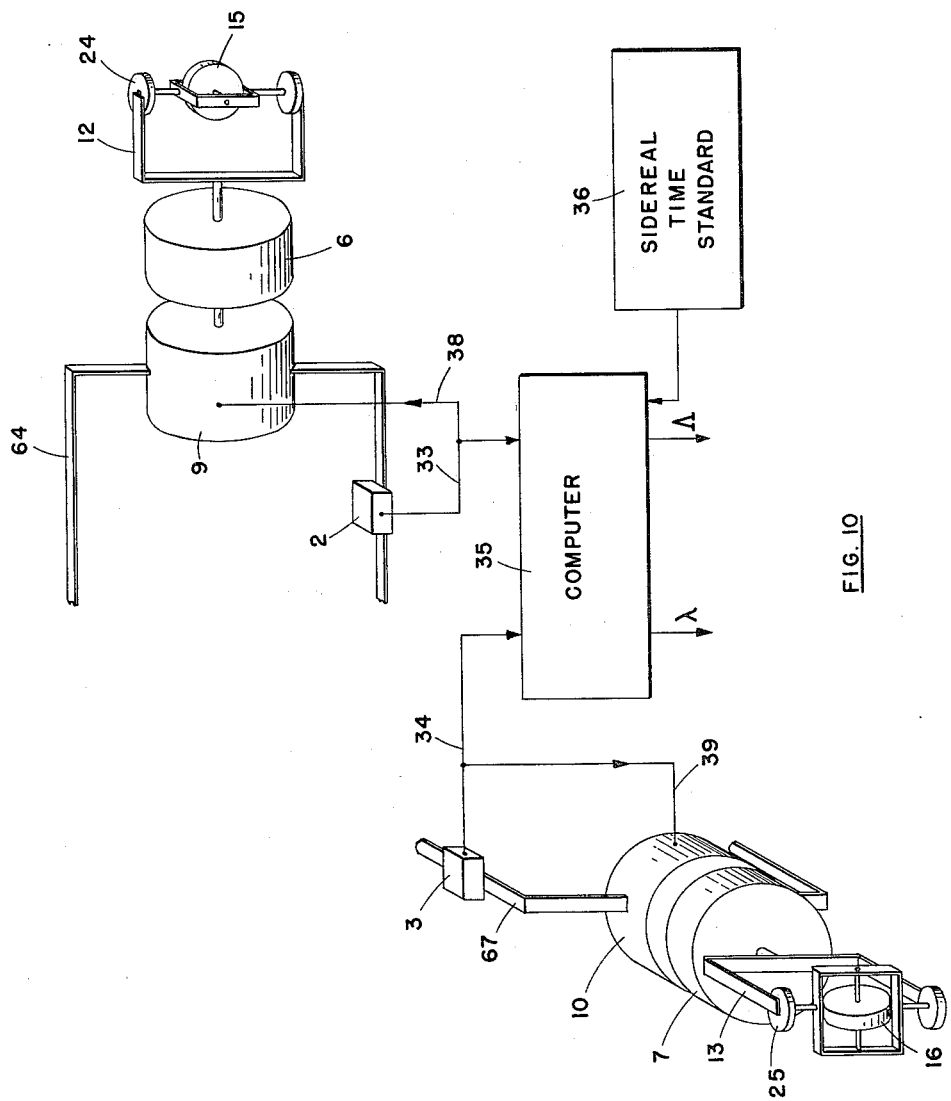
FIG. 10 illustrates the flow of information from accelerometers to the computer and to the motors and precision gear drives.

The incremental arc distance indicated by the $x$ direction inertial distance meter (distance meter 2) is divided by the radius of curvature of the earth to yield incremental angle traveled. This incremental angle is reproduced by the precision gear drive rotating the $x$ direction gyro 15, FIG. 1, by the same amount through electrical connections 33 and 38. See also FIG. 10. The result is to maintain the distance meter and platform locally level as far as the $x$ coordinate is concerned. The same mechanization is used for the $y$ direction, so that the net effect is to yield a system which will maintain its $z$ axis locally vertical in spite of motion over the earth. Having distance meters which are inertially sensitive to acceleration and provide the second integral thereof, their readings are, respectively $\iint A_x dt dt$ and $\iint A_y dt dt$. That is, they give distance readings which are acquired from double integration of the acceleration each experiences in its own sensitive direction. The acceleration experienced by the $x$ distance meter is broken down into the effects of R (distance from earth's center), $\dot{R}$ (change in distance from earth's center), $g_x$ or $g_y$ (component of gravitational force affecting the distance meter), and $\theta_y$ (the earthly angle traveled about the $y$ axis). The distance meter reading (on the left below) is composed as follows:

(1) $\quad \iint A_x dt dt = \int R d\theta_y + \iint \dot{R} d\theta_y dt + \iint g_x dt dt$ For the other distance meter, the expression is as follows:

(2) $\quad \iint A_y dt dt = -\int R d\theta_x - \iint \dot{R} d\theta_x dt + \iint g_y dt dt$ Assuming that the effects of gravity are removed from both distance meters by calculation or due provision and that R is a constant, the equations reduce to:

(3) $\quad \iint A_x dt dt = R\theta_y$ (4) $\quad \iint A_y dt dt = R\theta_x$ which denotes as described before, that dividing the distance meter readings by earth radius (which may be taken into account in the scale factor of the distance meter outputs) yields incremental angle traveled by the stable platform, by which amount each respective gyro 15 and 16 must be rotated. FIG. 10 does not indicate any allowance for gravitational effect upon the distance meters, nor for variations in R (distance to earth center). This does not preclude the superposition of correcting means for such effects.

The modification of the system as illustrated in FIG. 8, removing all angular velocity about the local vertical, introduces use of a different coordinate system. The measurement by the distance meters are no longer in earth coordinates. As a result, the information furnished by the distance meters must be resolved constantly as the platform travels, in order to give correct distance readings. These meters, held fixed in space with respect to rotation about the local vertical, will be constantly changing in direction, viewed from the earth. The partial diagram of the stable platform shown in FIG. 10 indicates the resolution of the distance meter readings by computer 35 in order to give latitude and longitude, $\lambda$ and $\Lambda$.

The formulas for calculating latitude and longitude from the distance meter information are:

(5) $\quad \dot{\lambda} = \dot{\theta}_x \cos \alpha - \dot{\theta}_y \sin \alpha$ (6) $\quad \dot{\Lambda} = \dfrac{\dot{\theta}_x \sin \alpha + \dot{\theta}_y \cos \alpha}{\cos \lambda} - \Omega_e$ where $\dot{\lambda}$ = rate of change in latitude $\dot{\Lambda}$ = rate of change in longitude $\alpha$ = angular deviation of the platform about the local vertical from alignment with the meridian line and (7) $\quad \dot{\alpha} = (\Omega_e + \dot{\Lambda}) \sin \lambda$ $\Omega_e$ = angular velocity of the earth $\dot{\theta}_x$ and $\dot{\theta}_y$ are, of course, the rates of change in respective distance meter readings, after having been divided by earth radius.

Equation 7 may also be expressed in differential form:

(8) $\quad d\alpha = (\Omega_e dt + d\Lambda) \sin \lambda$ knowing that $\Omega_e dt$ is incremental earth rotation angle and $d\Lambda$ is increment change in longitude, it can be seen that the changes in angle $\alpha$ are produced from summing or adding many increments modified by the sine of each local latitude.

The analogue computer 35 in FIG. 10 performs the above computations to give position in latitude and longitude.

If the distance meters are resolved to north-south and east-west coordinates, latitude and longitude will be obtained. However, it is realized that other directions or a guidance plane may be used, so that position is indicated in another coordinate system.

Further clarification of the distance and angle information as furnished by the distance meters may be had by a change or form of Equation 3 to read (9) $\quad \iint A_x dt dt = X = R\theta_y$

(10) $\quad \dfrac{dx}{dt} = \dfrac{R d\theta_y}{dt}$

(11) $\quad dx = R d\theta_y$

(12) $\quad \Delta\theta_y = \dfrac{\Delta_x}{R}$ which again shows that incremental angle traveled is equal to incremental distance indicated by the inertial distance meter divided by earth radius. The output of the distance meter is a number of pulses for each incremental distance traveled. Referring to Equation 12, it can be seen that the computer 35 need only be, effectually, an adding machine, to sum up the incremental angles traveled and a resolver according to the sine and cosine of angle α. Resolving takes care of the fact that successive increments of $\theta_y$ are not in the same plane. This is true of successive increments of $\theta_x$ also. This phenomenon occurs, it will be recalled, due to the fact that the distance meters do not assume any angular rotation about their vertical in inertial space.

Equations 5 and 6 may be modified to differential forms

(13) $\qquad d\lambda = d\theta_x \cos\alpha - d\theta_y \sin\alpha$

(14) $\qquad d\Lambda = \dfrac{d\theta_x \sin\alpha + d\theta_y \cos\alpha}{\cos\lambda} - \Omega_e dt$ which forms indicate that the changes in longitude and latitude are merely equal to the increments of angle traveled modified by sine and cosine resolution of angle α. As stated above, except for the resolution section then, the computer need only be an adding machine. There is no time function necessarily entered into the computer except to provide the fixed earthly rotation.

To compute latitude and longitude, the following equations from 13 and 14 are mechanized:

(15) $\qquad \lambda = \int \cos\alpha\, d\theta_x - \int \sin\alpha\, d\theta_y$

(16) $\qquad \int \cos\lambda\, d\Lambda = \int \sin\alpha\, d\theta_x + \int \cos\alpha\, d\theta_y - \int \Omega_e \cos\lambda\, dt$ FIG. 15 illustrates one possible analogue mechanization of the computer. The distance meters 2 and 3 are provided with follow-ups 82 and 83 which furnish a shaft rotation in accordance with the output of the distance meters. Integrators 84 and 85, which may be of the ball and disc type, receive the follow-up shaft rotations and servo rotations from resolver 86. Gear train 87 combines the output of integrators 84 and 85 to produce a shaft position which indicates latitude, λ. Resolver 88 provides trigonometric functions of latitude to servos 89 and 90. Integrator 91 receives a shaft rotation according to the cos λ, and another feedback error shaft rotation from differential 92. Differential 92 receives a shaft rotation from integrator 91 and integrators 93 and 94 and provides an output shaft position which indicates longitude, Λ. Integrator 95 receives information as to earth rotation and time from standard 36 and sin λ from resolver 88. Integrator 96 receives longitude information from differential 92 and sin λ information from resolver 88. Gear train 97 provides an output α to resolver 86. Motors 9 and 10, which rotate the gyros by precision gear drives, receive signals directly from distance meters 2 and 3. A basic reason for providing precision gear drives rather than a voltage torquing system for the gyros is the stringent requirement placed on the voltage supplies. An analogue computer as illustrated in FIG. 15 would require similarly precise voltage sources, and, therefore, would not be so desirable as a digital computer performing the same computation. In such an instance, nothing in the whole system requires precise voltages.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A stable platform comprising a stable element, three gyroscopes located upon said stable element two or more of which are adapted to be rotated about their input axes with respect to said stable element, pick-off means associated with each said gyroscope for detecting torque thereon, means for torquing said stable element in accordance with the output of said pick-off means to remove the torque from said gyroscopes, acceleration sensitive means located upon said stable element, and means for rotating said gyroscopes about their respective input axes relative to said stable element in accordance with the output of said acceleration sensitive means, said means for rotating further comprising means for maintaining each of said gyroscopes with zero component of angular velocity with respect to space about its input axis and for maintaining said stable element locally level, whereby said stable element achieves its stabilization.

2. A stable platform comprising a stable element, three gyroscopes located upon said stable element and adapted to be rotated with respect to said stable element about their respective input axes which are disposed at right angles to each other, pick-off means associated with respective gyroscopes for detecting torque thereupon, means for torquing said stable element according to the output of said pick-off means to remove the torque from said gyroscopes, acceleration measuring means located upon said platform, and means for rotating each of said gyroscopes relative to said stable element in accordance with the output of said acceleration measuring means to thereby maintain each of said gyroscopes without angular rotation in space about its input axis and maintain said stable element locally level, whereby said stable element achieves its stabilization.

3. A stable platform comprising a stable element supported in at least three degrees of rotational freedom, three gyroscopes with input axes perpendicular to each other located upon said stable element and two or more of said gyroscopes adapted to be rotated about their input axes with respect to said stable element, pick-off means associated with each said gyroscope for detecting torque upon each gyroscope, means for torquing said stable element in accordance with the outputs of said pick-off means so as to remove torques from said gyroscopes, inertial distance measuring means upon said stable element, and means for rotating respective gyroscopes adapted to be rotated relative to said stable element in accordance with distance traveled as indicated by said inertial distance measuring means, said means for rotating further maintaining each said rotatable gyroscope with zero angular velocity in space about its respective input axis and for maintaining said stable element locally level, whereby said stable element achieves its stabilization.

4. A stable platform comprising a stable element supported in at least three degrees of rotational freedom, at least three gyroscopes mounted upon said stable element with the input axis of one lying substantially along the vertical and the input axis of each of the other two in the horizontal plane of flight of said platform, drive means for rotating the gyroscopes whose sensitive axes lie in the horizontal plane of flight of said platform about their sensitive axes relative to said stable element, pick-off means associated with each of said gyroscopes for detecting torque thereupon, means for torquing said stable element in accordance with the outputs of said pick-off means so as to remove the torques from said gyroscopes, acceleration measuring means located upon said stable element and connected to said drive means for rotating said gyroscopes relative to said stable element said means for rotating further comprising means for maintaining each of said gyroscopes with zero angular velocity in space about its respective input axis and for maintaining said stable element locally level, whereby said stable element achieves its stabilization.

5. An autonavigator comprising a stable element supported in at least three degrees of rotational freedom, three or more gyroscopes located upon said stable element with the input axis of one lying along the vertical and the input axes of the other two in the horizontal plane of travel of said platform, means for rotating said gyroscopes whose input axes lie in the horizontal plane of travel about their respective input axes relative to said stable element, pick-off means associated with each of said gyroscopes for detecting torque thereupon, means for torquing said stable element in accordance with the outputs of said pick-off means to remove the torques from said gyroscopes, means sensitive to acceleration located upon said stable element providing information to said means for rotating said gyroscopes whose input axes lie in the horizontal plane of travel to thereby maintain said gyroscopes with zero angular velocity in space about their input axes and maintain said stable element locally level, whereby said stable element achieves its stabilization, and means for restraining the rotation of said gyroscope, whose input axis lies along the vertical, with respect to said stable element whereby said stable element does not rotate in space about local earth vertical, a time standard, computing means responsive to the output of said means sensitive to acceleration and said time standard to indicate the earth position of said stable platform.

6. A stable platform comprising a stable element supported in at least three degrees of rotational freedom, three gyroscope mounting frames disposed on said stable element and one adapted to be torqued relative to said stable element about an axis along the vertical and the other two about an axis in the horizontal plane of travel of said platform, a gyroscope mounted in each frame disposed with input axis along the same axis as its respective frame is adapted to be torqued and each of said gyroscopes adapted to be rotated about said axis relative to said frame, motor drive means for rotating each of said gyroscopes relative to said frame, pick-off means associated with each of said gyroscopes for detecting torque thereon, torquing means between said frame and said stable element responsive to said pick-off means to remove the torque from said gyroscopes, further means for torquing said stable element in response to said pick-off means to remove the torque from said gyroscopes, acceleration sensitive means disposed upon said platform connected to actuate said motor drives in response to the output of said acceleration sensitive means in order to keep said stable element locally level and maintain each of said gyroscopes with zero angular velocity in space about its input axis, whereby said stable element achieves its stabilization.

7. The combination recited in claim 6 wherein said acceleration sensitive means comprises two devices measuring in orthogonal directions to each other in the horizontal plane, and mounted on respective frames of said gyroscopes.

8. The combination recited in claim 6 wherein said acceleration sensitive means comprises two devices measuring in orthogonal directions to each other in the horizontal plane and mounted on respective frames of said gyroscopes so as to measure in a direction perpendicular to the axis of said frame.

9. An autonavigator comprising a stable element gimballed in at least three degrees of rotational freedom, distance meters mounted upon said stable element and disposed to measure in orthogonal directions, three gyroscopes, whose input axes are orthogonally disposed, located upon said stable element, two or more of said gyroscopes being adapted to be rotated about respective input axes relative to said stable element, pick-off means associated with each of said gyroscopes for detecting torque upon each of said gyroscopes, means for torquing said stable element in accordance with the outputs of said pick-off means so as to remove the torques from said gyroscopes, drive means for rotating said rotatable gyroscopes relative to said stable element, motor means adapted to drive said gear drive means in accordance with the outputs of said distance meters, said drive means and said motor means comprising means for maintaining said gyroscopes with zero angular velocity in space about their input axes and for maintaining said stable element locally level whereby said stable element achieves its stabilization, a time standard, computer means responsive to the outputs of said distance meters and said time standard to indicate the earthly position of said stable element.

10. An autonavigator comprising a stable element gimballed in three degrees of rotational freedom, distance meters mounted upon said stable element and disposed to measure in orthogonal directions, a first gyroscope disposed upon said stable element with its input axis lying along the vertical and adapted to be irrotational about its input axis in relation to said stable element, second and third gyroscopes disposed upon said stable element with their input axes lying in orthogonal directions relative to each other and in the horizontal plane of said stable element, means responsive to the outputs of said distance meters for rotating said second and third gyroscopes about their respective input axes relative to said stable element, pick-off means located upon said gyroscopes for detecting torques thereon, means for torquing said stable element in response to said pick-off means to remove torques from said gyroscopes, a time standard, and a computer responsive to the outputs of said distance meters and said time standard to compute the earth position of said stable element.

11. In an autonavigator, an element to be stabilized, means for mounting said element with a degree of freedom with respect to each axis about which said element is to be stabilized, gyroscopic means located on said element to be stabilized and disposed to detect angular motion about each axis about which said element is to be stabilized and means providing angular rotation about each input axis of said gyroscopic means, between said gyroscopic means and said element to be stabilized.

12. In an autonavigator, an element to be stabilized, means for mounting said element with at least one degree of freedom, a gyroscope located on said element to be stabilized and disposed to detect angular motion of said element about the axis of said degree of freedom, and means providing angular rotation of said gyroscope, between said gyroscope and said element to stabilized, said angular rotation being about the input axis of said gyroscope.

13. A stable platform comprising a frame, a plurality of gyros mounted on the frame, means for providing each of at least two of said gyros with a degree of freedom relative to the frame about both input and output axes of respective ones of said two gyros, means for stabilizing the frame under control of the gyros, and means for effecting a rotation of the frame relative to each of said two gyros about the gyro input axes.

14. A stable platform comprising a frame, a plurality of gyros mounted on the frame, means for providing each of at least two of said gyros with a degree of freedom relative to the frame about both input and output axes of respective ones of said two gyros, means for stabilizing the frame under control of the gyros, and means for effecting a rotation of the frame relative to each of said two gyros about the input axis of each of said two gyros according to respective components of earth rotation and motion of the frame relative to the earth.

15. An autonavigator comprising acceleration sensitive means, stable platform means for maintaining said acceleration sensitive means earth level, said acceleration sensitive means being mounted on said stable platform means, and means for rotating said platform means relative to the earth about the local vertical axis to maintain said platform and said acceleration sensitive means irrotational about said vertical axis with respect to inertial space, whereby the effects of Coriolis acceleration are at least partially removed from said acceleration sensitive means.

References Cited in the file of this patent

UNITED STATES PATENTS

| | | |
|---|---|---|
| 2,109,283 | Boykow | Feb. 22, 1938 |
| 2,368,673 | Metcalf | Feb. 6, 1945 |
| 2,414,108 | Knowles | Jan. 14, 1947 |
| 2,557,401 | Agins | June 19, 1951 |
| 2,581,851 | Gianoli | Jan. 8, 1952 |
| 2,660,793 | Holschuh | Dec. 1, 1953 |
| 2,752,792 | Draper | July 3, 1956 |
| 2,762,123 | Schultz | Sept. 11, 1956 |
| 2,811,785 | Braddon | Nov. 5, 1957 |
| 2,835,131 | Vacquier | May 20, 1958 |